(12) United States Patent
Akiba

(10) Patent No.: US 6,337,062 B1
(45) Date of Patent: Jan. 8, 2002

(54) METHOD FOR THE PRODUCTION OF ANHYDROUS ALKALI METAL SULFIDE AND ALKALI METAL SULFIDE SOLUTION

(75) Inventor: Iwao Akiba, Ichihara (JP)

(73) Assignees: Idemitsu Petrochemical Co., Ltd.; Petroleum Energy Center (PEC), both of Tokyo (JP)

( * ) Notice: Subject to any disclaimer, the term of this patent is extended or adjusted under 35 U.S.C. 154(b) by 0 days.

(21) Appl. No.: 09/512,456

(22) Filed: Feb. 24, 2000

(30) Foreign Application Priority Data

Feb. 25, 1999 (JP) .......................... 11-047327
Mar. 3, 1999 (JP) .......................... 11-055428

(51) Int. Cl.$^7$ .......................... C01B 17/22
(52) U.S. Cl. .......................... 423/566.2
(58) Field of Search .......................... 423/561.1, 566.2, 423/566.3

(56) References Cited

U.S. PATENT DOCUMENTS 2,662,000 A * 12/1953 Maschwitz .................. 23/134
3,692,471 A * 9/1972 Lyberger .................. 423/561
4,441,923 A * 4/1984 Swanson .................. 75/28
H429 H * 2/1988 Harris et al. .......... 423/561 R

FOREIGN PATENT DOCUMENTS

JP  3-285807 A * 12/1991
JP  7-207027 A *  8/1995
JP  7-330312 A * 12/1995

OTHER PUBLICATIONS

Mellor "A Comprehensive Treatise on Inorganice and Theoretical Chemistry" vol. X, published by Long Mans, Green and Co., London England, pp. 141–142. Code No. 95260, 1947.*

* cited by examiner

Primary Examiner—Timothy Vanoy
(74) Attorney, Agent, or Firm—Oblon, Spivak, McClelland, Maier & Neustadt, P.C.

(57) ABSTRACT

A method for producing an anhydrous alkali metal sulfide, which entails a) bubbling a solution of an alkali metal hydroxide in an aprotic organic solvent, such as N-alkylcaprolactam or N-alkylpyrrolidone, with hydrogen sulfide gas at a temperature between 50 and 250° C., thereby forming a product containing alkali metal hydrosulfide, and then b) terminating the hydrogen sulfide introduction after the system has come to contain substantially no water remaining therein, and heating the system, thereby effecting dehydrosulfurization to form the alkali metal sulfide.

32 Claims, 2 Drawing Sheets

METHOD FOR THE PRODUCTION OF ANHYDROUS ALKALI METAL SULFIDE AND ALKALI METAL SULFIDE SOLUTION

BACKGROUND OF THE INVENTION

1. Field of the Invention

The present invention relates to a method for producing a high-purity anhydrous alkaline metal sulfide. Precisely, it relates to a method for producing an anhydrous alkaline metal sulfide having a reduced impurity content, for which are used an alkaline metal hydroxide and hydrogen sulfide as the starting compounds.

The invention also relates to a method for producing an alkaline metal sulfide solution in which the ratio by mol of the alkaline metal to sulfur ratio is controlled. Precisely, the method, starting from an alkaline metal hydroxide and hydrogen sulfide, comprises forming an alkaline metal sulfide from the starting compounds, followed by partially hydrolyzing the sulfide to give the intended alkaline metal sulfide solution in which the ratio by mol of the alkaline metal to sulfur ratio is controlled.

2. Description of the Related Art

For the starting material in the field of recent engineering plastics and medicines, required are high-purity anhydrous alkaline metal sulfides. For example, in the art, anhydrous sodium sulfide has heretofore been used as the sulfur carrier in producing typical super-engineering plastics, polyarylene sulfides, through polymerization. On the other hand, the present applicant has previously proposed a method of using anhydrous lithium sulfide in producing polyarylene sulfide resins (see Japanese Patent Laid-Open No. 207027/1995). The method is advantageous in that the polyarylene sulfide resins produced are easy to separate from sodium chloride. However, lithium sulfide is expensive, and its industrial scale production is not as yet realized. In that situation, it is desired to establish an inexpensive method of producing high-quality lithium sulfide. For producing lithium sulfide, known are (1) a method of heating simple lithium with sulfur to a temperature not lower than the melting point of the reaction system (see Troost L.; Ann. Chim. Phys., 1857, 51(3), p. 103); (2) a method of reducing lithium sulfate under heat with carbon, hydrogen or ammonia (see K. V. Samsonof and S. V. Dorozdwa; Handbook to Sulfides—Physical Properties and Phase Diagrams—Moscow Metallurgy Publishing, 1972, Japan-Soviet Press); and (3) a method of reacting an alkaline metal hydroxide with hydrogen sulfide in a non-polar proton solvent to give lithium hydrosulfide followed by processing it for dehydrosulfurization (see the applicant's Japanese Patent Laid-Open No. 330312/1995).

However, the conditions for the methods (1) and (2) are extremely severe, therefore inevitably requiring complicated and severe production processes. The method (3) is the basis for the present invention, but there still remain some problems with it in point of the probability of stable production of products of high purity and quality. Specifically, in the method (3), the molar ratio of lithium/sulfur (referred to as Li/S) in lithium sulfide produced is 2.10 or more.

On the other hand, in producing polyarylene sulfides having a high molecular weight, used is an anhydrous alkaline metal sulfide, such as anhydrous sodium sulfide, anhydrous lithium sulfide or the like of high purity, as the sulfur carrier. Relating to this, one recent finding is that a solution of an alkaline metal sulfide in an aprotic solvent (hereinafter referred to as "an alkaline metal sulfide solution"), in which the alkaline metal-to-sulfur molar ratio in the alkaline metal sulfide is larger than 2.0, for example, between 2.1 and 2.2, is needed for producing high-grade polyarylene sulfides having different physical properties. For this, it is desired to establish a method for producing an alkaline metal sulfide solution in which the molar alkaline metal-to-sulfur molar ratio is controlled in any desired manner.

Up to now, no one could fine a proposal that may directly meet the requirement. Some related proposals are: <1> a method for controlling the Na/S ratio in sodium sulfide, which comprises adding NaOH or NaSH to the system containing sodium sulfide, or comprises mixing a metered amount of liquefied hydrogen sulfide with an aqueous solution of NaOH (see Japanese Patent Laid-Open No. 285807/1991); and <2> a method for controlling the Li/S ratio in lithium sulfide being used, as one starting compound, in producing polyarylene sulfides, which comprises bubbling a lithium hydroxide-containing N-methyl-2-pyrrolidone (NMP) solution with hydrogen sulfide being introduced thereinto to thereby remove alkaline metal chlorides and others from the system, followed by further bubbling the system with nitrogen being introduced thereinto under heat, or comprises adding a lithium salt such as lithium hydroxide, lithium N-methylaminobutyrate (LMAB) or the like to the system (see the applicant's Japanese Patent Laid-Open No. 207027/1995).

However, the method that comprises adding such a sodium salt or a lithium salt to the reaction system is undesirable, as requiring complicated operations. The other method that comprises reacting a metered amount of liquefied hydrogen sulfide with NaOH or LiOH requires pressure equipment, for which the equipment costs are high. In still the method that comprises bubbling the system with nitrogen being introduced thereinto under heat, the sulfur content of the system is controlled. In this, however, lithium hydrosulfide is subjected to dehydrosulfurization, namely, in this, its Li/S ratio is varied from 1 to 2, but not controlled to a desired one.

The invention is to provide a method for producing a high-purity anhydrous alkaline metal sulfide having a reduced content of alkaline metal hydroxides and alkaline metal hydrosulfides, more concretely, having an alkaline metal-to-sulfur molar ratio that falls within the following range:

1.90≦ alkaline metal/sulfur (by mol) ≦2.10, the method comprising reacting an alkaline metal hydroxide with hydrogen sulfide in an aprotic organic solvent to give an alkaline metal hydrosulfide, followed by subjecting it to dehydrosulfurization.

The invention is also to provide a method for producing an alkaline metal sulfide solution in which the alkaline metal-to-sulfur molar ratio is controlled, especially to be larger than 2.

SUMMARY OF THE INVENTION

The present inventor has analyzed the origins of the impurities to be in lithium sulfide in the prior basic patent application (Japanese Patent Laid-Open No. 330312/1995), and has found the following:

(1) In the system of reaction between an alkaline metal hydroxide and hydrogen sulfide in an aprotic organic solvent, if water formed through the reaction remains therein, an alkaline metal hydroxide is formed through hydrolysis of the following formula (I) or (II) during the reaction for dehydration and dehydrosulfurization:

$$LiSH + H_2O \rightarrow LiOH + H_2S \quad (I),$$

$$Li_2S + 2H_2O \rightarrow 2LiOH + H_2S \quad (II);$$

and the alkaline metal hydroxide thus formed will be an impurity in the final product, lithium sulfide, thereby making the ratio Li/S in the final product larger than 2.0;

(2) On the other hand, if non-reacted lithium hydrosulfide remains in the reaction system for dehydrosulfurization to give lithium sulfide according to the following formula (III):

$$2LiSH \rightarrow Li_2S + H_2S \quad (III),$$

this will also be an impurity in the final product, lithium sulfide, thereby making the ratio Li/S in the final product smaller than 2.0.

Based on these findings, the inventor has completed the present invention.

Specifically, the invention relating to the production of an anhydrous alkaline metal sulfide includes the following:

[1] A method for producing an anhydrous alkaline metal sulfide, which comprises bubbling a solution of an alkaline metal hydroxide in an aprotic organic solvent, with hydrogen sulfide gas being introduced thereinto under heat for dehydration and dehydrosulfurization, then stopping the hydrogen sulfide introduction after the system has come to contain substantially no water remaining therein, and further heating the system for dehydrosulfurization.

[2] A method for producing an anhydrous alkaline metal sulfide, which comprises bubbling a solution of an alkaline metal hydroxide in an aprotic organic solvent, with hydrogen sulfide gas being introduced thereinto under heat for dehydration and dehydrosulfurization, and, after the system has come to contain substantially no water remaining therein, further bubbling the system with an inert gas but not hydrogen sulfide gas being introduced thereinto for dehydrosulfurization.

[3] The method for producing an anhydrous alkaline metal sulfide of above [1] or [2], wherein the solution of an alkaline metal hydroxide in an aprotic organic solvent contains a compound capable of being azeotropic with water.

[4] A method for continuously producing an anhydrous alkaline metal sulfide, which comprises:
(1) continuously feeding a solution of an alkaline metal hydroxide in an aprotic organic solvent into a reactor unit having a stirrer therein and equipped with a distillation tower or column, with the liquid level in the reactor being kept constant;
(2) bubbling the solution in the reactor with hydrogen sulfide gas being introduced thereinto under heat for dehydration and dehydrosulfurization, while the pressure in the reactor is controlled to fall between 2 mmHg abs. and 2.0 kg/cm$^2$G, and the temperature therein to fall between 50 and 250° C.;
(3) (i) expelling the side product, water and hydrogen sulfide from the system through distillation, and (ii) optionally recycling at least a part of the expelled hydrogen sulfide for bubbling the system; and
(4) after the system has come to contain substantially no water remaining therein, transferring the solution of the intermediate, alkaline metal hydrosulfide in the aprotic organic solvent into a degassing tank, followed by heating it or further bubbling it with an inert gas being introduced thereinto for dehydrosulfurization.

[5] A method for continuously producing an anhydrous alkaline metal sulfide, which comprises:
(1) continuously feeding a solution of an alkaline metal hydroxide and a compound capable of being azeotropic with water in an aprotic organic solvent into a reactor unit having a stirrer therein and equipped with a distillation tower or column, with the liquid level in the reactor being kept constant;
(2) bubbling the solution in the reactor with hydrogen sulfide gas being introduced thereinto under heat for dehydration and dehydrosulfurization, while the pressure in the reactor is controlled to fall between 2 mmHg abs. and 2.0 kg/cm$^2$G, and the temperature therein to fall between 50 and 250° C.;
(3) (i) separating the side product, water, hydrogen sulfide, and the azeotropic compound through distillation, and expelling the side product, water and hydrogen sulfide from the system;
(ii) optionally recycling at least a part of the expelled hydrogen sulfide for bubbling the system; and
(iii) recirculating the azeotropic compound having been condensed and separated from water in the receiver at the top of the distillation tower or column, back into the reactor unit optionally along with a part of a fresh azeotropic compound; and
(4) after the system has come to contain substantially no water remaining therein, transferring the solution of the intermediate, alkaline metal hydrosulfide in the aprotic organic solvent into a degassing tank, followed by heating it or further bubbling it with an inert gas being introduced thereinto for dehydrosulfurization.

In addition, the inventor has studied the problems with the method for producing an alkaline metal sulfide solution noted above, and, as a result, has found that the problems with the method can be solved by hydrolyzing a part of the alkaline metal sulfide formed through the reaction between an alkaline metal hydroxide and hydrogen sulfide. On the basis of this finding, the inventor has further completed the present invention.

Specifically, the invention relating to the production of an alkaline metal sulfide solution includes the following:

[1] A method for producing an alkaline metal sulfide solution with the alkaline metal-to-sulfur molar ratio therein being controlled, which comprises bubbling a solution of an alkaline metal hydroxide in an aprotic organic solvent, with hydrogen sulfide gas being introduced thereinto under heat for dehydration and dehydrosulfurization, then stopping the hydrogen sulfide gas introduction after the system has come to contain substantially no water remaining therein, adding a predetermined amount of water to the system, and further heating the system for dehydrosulfurization with preventing water from flowing out of the system.

[2] A method for producing an alkaline metal sulfide solution with the alkaline metal-to-sulfur molar ratio therein being controlled, which comprises bubbling a solution of an alkaline metal hydroxide in an aprotic organic solvent, with hydrogen sulfide gas being introduced thereinto under heat for dehydration and dehydrosulfurization, then adding a predetermined amount of water to the system after the system has come to contain substantially no water remaining therein, heating the system with preventing water from flowing out of the system, and further bubbling the system with an inert gas but not hydrogen sulfide gas being introduced thereinto for dehydrosulfurization.

[3] A method for producing an alkaline metal sulfide solution with the alkaline metal-to-sulfur molar ratio therein being controlled, which comprises bubbling a solution of an alkaline metal hydroxide in an aprotic organic solvent, with hydrogen sulfide gas being introduced thereinto under heat for dehydration and dehydrosulfurization, then stopping the hydrogen sulfide gas introduction after the water content remaining in the system has reached a predetermined amount, and further heating the system for dehydrosulfurization with preventing water from flowing out of the system.

[4] A method for producing an alkaline metal sulfide isolution with the alkaline metal-to-sulfur molar ratio therein being controlled, which comprises bubbling a solution of an alkaline metal hydroxide in an aprotic organic solvent, with hydrogen sulfide gas being introduced thereinto under heat for dehydration and dehydrosulfurization, and, after the water content remaining in the system has reached a predetermined amount, further heating the system with preventing water from flowing out of the system and bubbling it with an inert gas but not hydrogen sulfide gas being introduced thereinto for dehydrdsulfurization.

[5] The method of any one of above [1] to [4] for producing an alkaline metal sulfide solution with the alkaline metal-to-sulfur molar ratio therein being controlled, wherein the solution of an alkaline metal hydroxide solution in an aprotic organic solvent contains a compound capable of being azeotropic with water.

[6] A method for continuously producing an alkaline metal sulfide solution with the alkaline metal-to-sulfur molar ratio therein being controlled, which comprises:
(1) continuously feeding a solution of an alkaline metal hydroxide and optionally a compound capable of being azeotropic with water in an aprotic organic solvent into a reactor unit having a stirrer therein and equipped with a distillation tower or column, with the liquid level in the reactor being kept constant;
(2) bubbling the solution in the reactor with hydrogen sulfide gas being introduced thereinto under heat for dehydration and dehydrosulfurization, while the pressure in the reactor is controlled to fall between 2 mmHg abs. and 2.0 kg/cm$^2$G, and the temperature therein to fall between 50 and 250° C.;
(3) (i) expelling the side product, water and hydrogen sulfide from the system through distillation,
(ii) optionally recycling at least a part of the expelled hydrogen sulfide for bubbling the system; and
(iii) recirculating the azeotropic compound having been condensed and separated from water in the receiver at the top of the distillation tower or column, back into the reactor unit optionally along with a part of a fresh azeotropic compound; and
(4) after the system has come to contain substantially no water remaining therein, stopping the hydrogen sulfide gas introduction, then transferring the liquid from the reactor to a hold tank, adding thereto a predetermined amount of water, stopping expelling water from the system, and subsequently heating the system or bubbling the system with an inert gas being introduced thereinto under heat for dehydrosulfurization.

[7] A method for continuously producing an alkaline metal sulfide solution with the alkaline metal-to-sulfur molar ratio therein being controlled, which comprises:
(1) continuously feeding a solution of an alkaline metal hydroxide and optionally a compound capable of being azeotropic with water in an aprotic organic solvent into a reactor unit having a stirrer therein and equipped with a distillation tower or column, with the liquid level in the reactor being kept constant;
(2) bubbling the solution in the reactor with hydrogen sulfide gas being introduced thereinto under heat for dehydration and dehydrosulfurization, while the pressure in the reactor is controlled to fall between 2 mmHg abs. and 2.0 kg/cm$^2$G, and the temperature therein to fall between 50 and 250° C.;
(3) (i) expelling the side product, water and hydrogen sulfide from the system through distillation,
(ii) optionally recycling at least a part of the expelled hydrogen sulfide for bubbling the system; and
(iii) recirculating the azeotropic compound having been condensed and separated from water in the receiver at the top of the distillation tower or column, back into the reactor unit optionally along with a part of a fresh azeotropic compound; and
(4) after the water content remaining in the system has reached a predetermined amount, stopping the hydrogen sulfide gas introduction, then transferring the liquid from the reactor to a hold tank, stopping expelling water from the system, and subsequently heating the system or bubbling the system with an inert gas being introduced thereinto under heat for dehydrosulfurization.

1: lithium hydroxide,
2: hydrogen sulfide gas,
3: hydrogen sulfide, water, and azeotropic agent,
4: water,
5: hydrogen sulfide gas,
6: azeotropic agent,
7: hydrogen sulfide and azeotropic agent,
8: anhydrous lithium sulfide,
9: step of hydrosulfurization and dehydration,
10: step of dehydrosulfurization and recovery of azeotropic agent.

Figure 2:
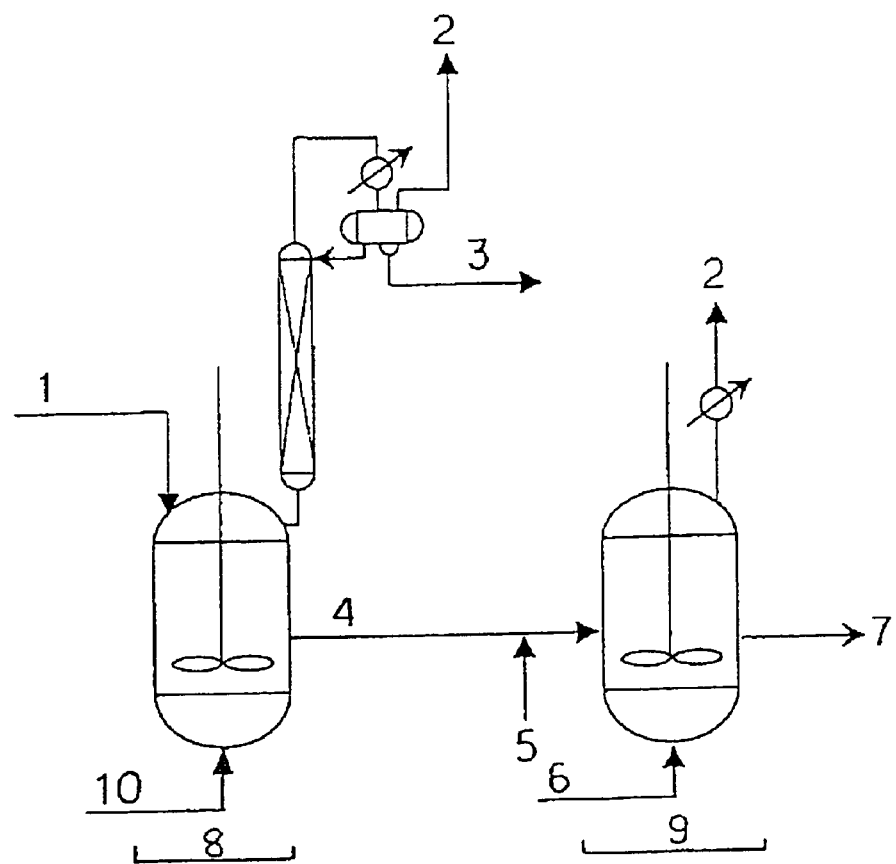

FIG. 2 is a flow chart for continuous production of an alkaline metal sulfide solution with the alkaline metal-to-sulfur molar ratio being controlled, in which the reference numerals 1 to 10 have the following meanings:

1: raw material (alkaline metal hydroxide, NMP),
2: hydrogen sulfide gas,
3: water and NMP,
4: solution of alkaline metal sulfide in NMP,
5: water,
6: nitrogen gas,
7: solution of alkaline metal sulfide in NMP with the alkaline metal-to-sulfur molar ratio being controlled,
8: step of hydrosulfurization and dehydration,
9: step of hydrolysis and dehydrosulfurization,
10: hydrogen sulfide gas.

DESCRIPTION OF THE PREFERRED EMBODIMENTS

Method for Producing High-purity Anhydrous Alkaline Metal Sulfide

First Embodiment

The first embodiment of the invention is a method for producing an anhydrous alkaline metal sulfide, which comprises bubbling a solution of an alkaline metal hydroxide in an aprotic organic solvent, with hydrogen sulfide gas being introduced thereinto for dehydration and dehydrosulfurization under a pressure falling between 2 mmHg abs. and 2.0 kg/cm$^2$G and under heat at a temperature falling between 50 and 250° C., then stopping the hydrogen sulfide introduction after the system has come to contain substantially no water remaining therein, and further heating the system for dehydrosulfurization.

(1) Reaction condition:

In the invention, the pressure in the reactor is controlled to fall between 2 mmHg abs. and 2.0 kg/cm$^2$G and the temperature therein to fall between 50 and 250° C., but preferably the pressure is controlled to fall between 400 mmg abs. and 1.5 kg/cm$^2$G and the temperature to fall between 100 and 200° C. If the reaction pressure is higher than 2.0 kg/cm$^2$G, the reaction container to be used requires severer conditions and is disadvantageous in the economic aspect. If the reaction temperature is lower than 50° C., the solubility of the alkaline metal hydroxide in the solvent will be low. If so and if an azeotropic agent is added to the solution, the concentration of the azeotropic agent in the liquid phase will increase, whereby the solubility of the alkaline metal hydroxide in the solution will decrease more and the hydrosulfurization of the compound will be more difficult. If, on the other hand, the reaction temperature is higher than 250° C., the reaction pressure will unfavorably increase and, in addition, the aprotic organic solvent used will decompose to have some negative influences on the intended reaction. For more preferred reaction conditions, lower temperatures are preferred for gas absorption but higher temperatures are preferred for gas removal. In consideration of the properties of the aprotic organic solvent which is unstable under heat, preferred are the low temperature range and the low pressure range defined as above.

(2) Alkaline metal hydroxide:

The alkaline metal hydroxide for use in the invention is not specifically defined so far as its purity is high, and includes, for example, lithium hydroxide, sodium hydroxide, potassium hydroxide, etc. Preferred are anhydrides, but hydrates are also employable herein. Especially preferred is lithium hydroxide, though expensive.

(3) Aprotic organic solvent:

As the aprotic organic solvent for use in the invention, generally preferred are single solvents or mixed solvents of aprotic polar organic solvents (e.g., amide compounds, lactam compounds, urea compounds, organosulfur compounds, cyclic organophosphorus compounds, etc.). Of those aprotic polar organic compounds, the amide compounds include, for example, N,N-dimethylformamide, N,N-diethylformamide, N,N-dimethylacetamide, N,N-diethylacetamide, N,N-dipropylacetamide, N,N-dimethylbenzoic acid amide, etc.

The lactam compounds include, for example, caprolactam; N-alkylcaprolactams such as N-methylcaprolactam, N-ethylcaprolactam, N-isopropylcaprolactam, N-isobutylcaprolactam, N-n-propylcaprolactam, N-n-butylcaprolactam, N-cyclohexylcaprolactam, etc.; as well as N-methyl-2-pyrrolidone (NMP), N-ethyl-2-pyrrolidone, N-isopropyl-2-pyrrolidone, N-isobutyl-2-pyrrolidone, N-n-propyl-2-pyrrolidone, N-n-butyl-2-pyrrolidone, N-cyclohexyl-2-pyrrolidone, N-methyl-3-methyl-2-pyrrolidone, N-ethyl-3-methyl-2-pyrrolidone, N-methyl-3,4,5-trimethyl-2-pyrrolidone, N-methyl-2-piperidone, N-ethyl-2-piperidone, N-isopropyl-2-piperidone, N-methyl-6-methyl-2-piperidone, N-methyl-3-ethyl-2-piperidone, ect.

The organosulfur compounds include, for example, dimethylsulfoxide, diethylsulfoxide, diphenylenesulfone, 1-methyl-1-oxosulforane, 1-ethyl-1-oxosulforane, 1-phenyl-1-oxosulforane, etc.

One or more of these aprotic polar organic solvents may be used herein either singly or as combined, and optionally further combined with any other solvent components not interfering with the object of the invention.

Of the aprotic organic solvents mentioned above, preferred are N-alkylcaprolactams and N-alkylpyrrolidones; and more preferred is N-methyl-2-pyrrolidone.

(4) Hydrogen sulfide:

Hydrogen sulfide for use in the invention is not specifically defined.

(5) Ratio of reactants:

The ratio of hydrogen sulfide to the alkaline metal hydroxide in the invention generally falls between 0.80 and 6.00, but preferably between 0.95 and 3.00 in terms of the hydrogen sulfide-to-alkaline metal hydroxide ratio by mol. Within that range, the reactants will well react with each other.

(6) Production method:

Under the reaction condition noted above, the alkaline metal hydroxide is reacted with hydrogen sulfide in an aprotic organic solvent to give an alkaline metal hydrosulfide. In this reaction, the side product, water will hydrolyze the alkaline metal hydrosulfide and even the alkaline metal sulfide to be finally produced in the method of the invention. Therefore, to prevent the hydrolysis, the reaction system is dehydrated. For this, in the method of the invention, the reaction system is bubbled with hydrogen sulfide gas introduced thereinto under heat for dehydration and dehydrosulfurization. Through the hydrogen sulfide gas bubbling, the alkaline metal hydroxide is converted into an alkaline metal hydrosulfide, and, in addition, the bubbling prevents the alkaline metal hydrosulfide and even the alkaline metal sulfide formed from being hydrolyzed. Therefore, in the method of the invention, the hydrogen sulfide bubbling may be continued before the system comes to contain substantially no water remaining therein. More concretely, the condition where "the system contains substantially no water remaining therein" is meant to indicate that the water concentration in the reaction liquid is at most 5% by weight, more preferably atmost 0.5% by weight. In that controlled condition, the alkaline metal hydroxide to be formed through hydrolysis is prevented from being in the final product, alkaline metal sulfide, whereby the alkaline metal-to-sulfur molar ratio in the final compound could be at most 2.10. The bubbling hydrogen sulfide pressure may be normal pressure or increased pressure; and the flow rate of the bubbling gas is not specifically defined. The bubbling time shall be not shorter than the time to be obtained by dividing the necessary amount of hydrogen sulfide (this is calculated from the ratio of the reactants, that is, the hydrogen sulfide-to-alkaline metal hydroxide ratio noted above) by the flow rate of the bubbling hydrogen sulfide gas. Namely, in the invention, an excess amount of hydrogen sulfide must be bubbled into the reaction system, relative to the amount of the other reactant, alkaline metal hydroxide, and, in addition, the bubbling must be continued before the system comes to contain substantially no water remaining therein. The gas bubbling method is not specifically defined, for which, however, preferred is a reactor unit having a stirrer for stirring the alkaline metal hydroxide and equipped with a condenser at its top.

After the system has come to contain substantially no water remaining therein, the hydrogen sulfide bubbling is stopped, and the system is further heated for dehydrosulfurization. Being thus heated, the alkaline metal hydrosulfide thus formed in this stage is converted into the final product, alkaline metal sulfide. During the previous a dehydration stage, hydrogen sulfide is formed as the side product, and it acts for dehydrosulfurizing the intermediate, alkaline metal hydrosulfide. After the dehydration stage, in addition, the intermediate, alkaline metal hydrosulfide is exclusively dehydrosulfurized under heat to give the final product, alkaline metal sulfide. If the final stage dehydrosulfurization is not effected satisfactorily, the non-reacted alkaline metal hydrosulfide will remain in the final product, alkaline metal sulfide.

The non-reacted alkaline metal hydrosulfide, if any, in the reaction liquid may be identified by measuring its concentration therein, but, in general, its presence in the reaction liquid could be estimated from the reaction time. Regarding the reaction time, it is desired that the alkaline metal-to-sulfur molar ratio in the final product, alkaline metal sulfide could reach at least 1.90 within the reaction time, but in view of the economic aspect, the reaction time is preferably not longer than 6 hours.

After the reaction, the alkaline metal sulfide formed and deposited in the reactor is separated and taken out through centrifugation, and dried to be the final product, anhydrous alkaline metal sulfide.

Second Embodiment

The second embodiment of the invention for producing the high-purity anhydrous alkaline metal sulfide differs from the first embodiment thereof in that, in the first embodiment, "the hydrogen sulfide bubbling is stopped after the system has come to contain substantially no water remaining therein, and the system is further heated for dehydrosulfurization", while in the second embodiment, "after the system has come to contain substantially no water remaining therein, it is further bubbled with an inert gas but not hydrogen sulfide gas introduced thereinto for dehydrosulfurization".

Specifically, in the step of exclusive dehydrosulfurization after dehydration to give the final product, alkaline metal sulfide, in the second embodiment, the system having been dehydrated is further bubbled with an inert gas introduced thereinto for thereby accelerating the intended dehydrosulfurization. The inert gas bubbling in this step is more effective for the final treatment to give a high-purity anhydrous alkaline metal sulfide.

The bubbling inert gas for use in the invention is not specifically defined, but, in general, preferred is nitrogen gas. The bubbling inert gas pressure is not also specifically defined, and may be normal pressure or increased pressure. The bubbling gas flow rate is not also specifically defined. The bubbling time may be controlled by measuring the concentration of the non-reacted alkaline metal hydrosulfide remaining in the reaction liquid, but, in general, it could be estimated from the bubbling gas flow rate. Regarding the reaction time, it is desired that the alkaline metal-to-sulfur molar ratio in the final product, alkaline metal sulfide could reach at least 1.90 within the reaction time, but in view of the economic aspect, the reaction time is preferably not longer than 6 hours.

Third Embodiment

The third embodiment of the invention for producing the high-purity anhydrous alkaline metal sulfide is to follow the first and second embodiments, in which, however, a compound capable of being azeotropic with water is added to the starting reaction system to give the intended anhydrous alkaline metal sulfide.

The compound capable of being azeotropic with water for use in the invention is preferably one having a boiling point of not higher than 200° C., including, for example, aromatic hydrocarbons such as benzene, toluene, ethylbenzene, etc.; aliphatic hydrocarbons such as pentane, hexane, cyclohexane, etc.; halogenohydrocarbons such as chlorobenzene, p-dichlorobenzene, etc. Of those, especially preferred are toluene and p-dichlorobenzene.

Adding such a compound capable of being azeotropic with water to the reaction system in the invention enables the reaction at lower temperatures, therefore evading the negative influences of the thermally-unstable, aprotic organic solvent on the reaction. The azeotropic compound used in the third embodiment can be removed from the system along with water, and the same as in the first and second embodiments shall directly apply to the third embodiment. Accordingly, in the third embodiment, the reaction liquid is bubbled with hydrogen sulfide introduced thereinto under heat for dehydration and dehydrosulfurization, and, after the system has come to contain substantially no water remaining therein, the hydrogen sulfide bubbling is stopped and the system is further heated or is bubbled with an inert gas introduced thereinto under heat for dehydrosulfurization thereby to give the final product, anhydrous alkaline metal sulfide.

The amount of the azeotropic compound to be used shall be generally the necessary amount thereof for forming an azeotrope with water originally existing in the starting system and also with water produced as the side product through the reaction, and it varies depending on the type of the azeotropic compound. For example, for toluene, its amount to be used may be at least one mol relative to one mol of water.

Fourth Embodiment

The fourth embodiment of the invention for producing the high-purity anhydrous alkaline metal sulfide is a continuous process for the first and second embodiments and also for the third embodiment where a compound capable of azeotropic with water is added to the starting reaction system. As compared with the batch process of others, the continuous process of the fourth embodiment is advantageous in that the bubbling hydrogen sulfide and the azeotropic compound can be recycled and, in addition, the starting liquid can be continuously put into the hot reaction system having been already heated. Therefore, in the continuous process, the time for system dehydration under heat can be shortened, and the time for which the reaction system is kept in contact with water that may cause hydrolysis can also be shortened.

Figure 1:
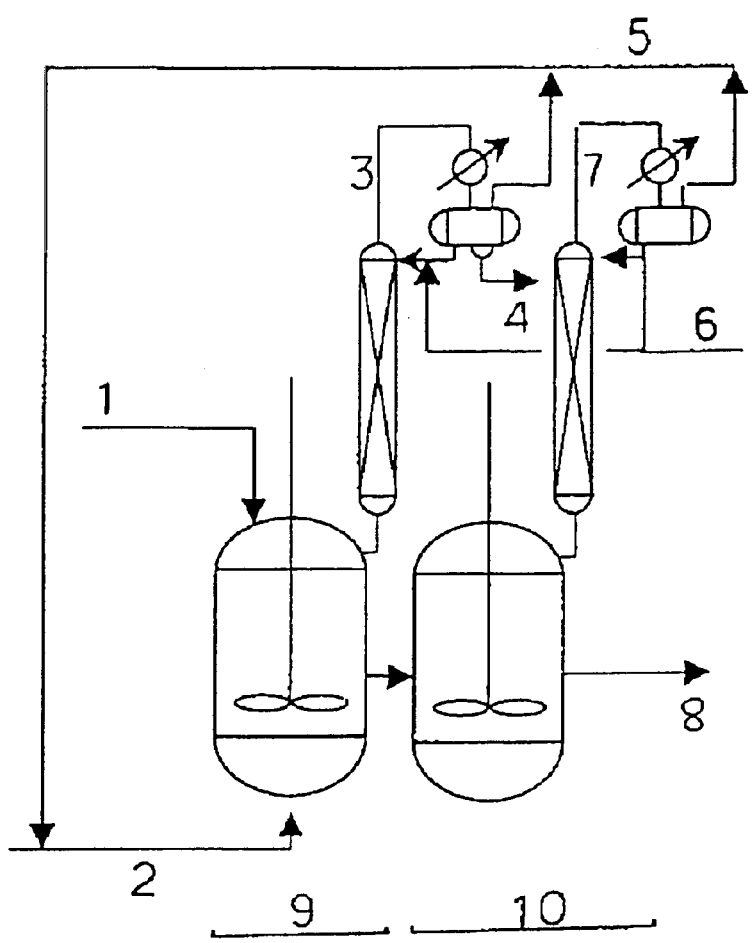
FIG. 1 is a flow chart for continuous production of an anhydrous alkaline metal sulfide according to the invention, in which the reference numerals 1 to 10 have the following meanings.

(1) Method of the invention for continuous production of high-purity anhydrous alkaline metal sulfide:

The process flow chart of the method of the invention for continuously producing the high-purity anhydrous alkaline metal sulfide is shown in FIG. 1, which is referred to in the following description.

1) A solution of an alkaline metal hydroxide and optionally a compound capable of being azeotropic with water in an aprotic organic solvent is continuously fed into a reactor unit having a stirrer therein and equipped with a distillation tower or column, with the liquid level in the reactor being kept constant.

In this step, the starting reaction liquid is continuously fed into the reactor. In the reactor, the liquid is stirred to such a degree that the alkaline metal hydroxide therein does not deposit.

2) The solution in the reactor is bubbled with hydrogen sulfide gas introduced thereinto under heat for dehydration and dehydrosulfurization, while the pressure in the reactor is controlled to fall between 2 mmHg abs. and 2.0 kg/cm²G, and the temperature therein to fall between 50 and 250° C.

In this step, the hydrogen sulfide gas is introduced into the reactor through its bottom, whereby the liquid in the reactor is entirely bubbled and heated.

3) (i) The side product, water and hydrogen sulfide are expelled from the system through distillation, and (ii) optionally, at least a part of the expelled hydrogen sulfide is recycled for bubbling the system.

In this step, the side product, water, hydrogen sulfide, and also the azeotropic compound, if used, are evaporated away through the top of the distillation tower or column. Of these, the hydrogen sulfide gas is recovered in a condenser, and recycled for bubbling the system, while, the others, the condensed water and azeotropic compound are separated in a separator. Only the thus-separated azeotropic compound is recirculated into the system, and water is discharged outside the system.

4) After the system has come to contain substantially no water remaining therein, the solution of the intermediate, alkaline metal hydrosulfide formed in the aprotic organic solvent is transferred into a degassing tank, in which the solution is further heated or bubbled with an inert gas for dehydrosulfurization.

In this step, the presence or substantial absence of water remaining in the liquid system can be confirmed by measuring the water content of the system. Concretely, in this step, the amount of water in the system having been heated and bubbled with hydrogen sulfide gas is controlled until the amount of water evaporated away along with the azeotropic compound could be balanced with the amount of water originally existing in the starting reaction liquid put into the reactor. After this, the liquid is transferred into a degassing tank, in which it is further heated or bubbled with an inert gas introduced thereinto for dehydrosulfurization. In this stage, hydrogen sulfide and the azeotropic compound are evaporated away through the top of the distillation column provided at the top of the degassing tank. The thus-evaporated hydrogen sulfide gas is recovered in a condenser and recycled for bubbling, and the condensed azeotropic compound is also recovered.

After a predetermined period of time, a solution containing the product, alkaline metal sulfide is taken out of the degassing tank, and centrifuged to separate the product. The product is then dried to be the intended anhydrous alkaline metal sulfide.

Method for Producing Alkaline Metal Sulfide Solution
First Embodiment

The first embodiment of the invention for producing an alkaline metal sulfide solution comprises bubbling a solution of an alkaline metal hydroxide in an aprotic organic solvent, with hydrogen sulfide gas being introduced thereinto under heat for dehydration and dehydrosulfurization, then stopping the hydrogen sulfide gas introduction after the system has come to contain substantially no water remaining therein, adding a predetermined amount of water to the system, and further heating the system for dehydrosulfurization with preventing water from flowing out of the system. In the solution thus produced, the alkaline metal-to-sulfur molar ratio is controlled.

(1) Reaction condition:
In the invention, the pressure in the reactor is controlled to fall between 2 mmHg abs. and 2.0 kg/cm²G and the temperature thereinto fall between 50 and 250° C., but preferably the pressure is controlled to fall between 400 mmHg abs. and 1.5 kg/cm²G and the temperature to fall between 100 and 200° C. If the reaction pressure is higher than 2.0 kg/cm²G, the reaction container to be used requires severer conditions and is disadvantageous in the economic aspect. If the reaction temperature is lower than 50° C., the solubility of the alkaline metal hydroxide in the solvent will be low. If so and if an azeotropic agent is added to the solution, the concentration of the azeotropic agent in the liquid phase will increase, whereby the solubility of the alkaline metal hydroxide in the solution will decrease more and the hydrosulfurization of the compound will be more difficult. If, on the other hand, the reaction temperature is higher than 250° C., the reaction pressure will unfavorably increase and, in addition, the aprotic organic solvent used will decompose to have some negative influences on the intended reaction.

The alkaline metal hydroxide (2), the aprotic organic solvent (3) and the hydrogen sulfide (4) for use herein, and also the ratio of the alkaline metal hydroxide to hydrogen sulfide (5) herein are all the same as those described hereinabove in the section of "method for producing high-purity anhydrous alkaline metal sulfide".

(6) Amount of water to be added:
Water necessary for hydrolyzing the alkaline metal sulfide and the alkaline metal hydrosulfide formed is added to the reaction system, and its amount is at least equivalent by mol to the amount of the alkaline metal hydroxide enough to ensure the intended alkaline metal-to-sulfur molar ratio in the product. However, if too much water over the necessary amount is added to the system, it is unfavorable as it has some negative influences on polymerization to form polyarylene sulfides, etc. Through hydrolysis with water added, the alkaline metal-to-sulfur molar ratio in the final product, alkaline metal sulfide, can be controlled to be at least 2.0.

(7) Production method:
For controlling the alkaline metal-to-sulfur molar ratio in the final product, alkaline metal sulfide solution, the amount of water to be added to the reaction system is controlled to thereby control the degree of hydrolysis of the product. In the first embodiment of the method for producing the final product, alkaline metal sulfide solution, an alkaline metal sulfide having a reduced impurity content is formed, and then hydrolyzed.

Under the reaction condition noted above, the solution of an alkaline metal hydroxide in an aprotic organic solvent is fully bubbled with hydrogen sulfide gas introduced thereinto to such a degree that no solid is seen in the reaction system, thereby forming an alkaline metal hydrosulfide. Simultaneously with this, the alkaline metal hydrosulfide and the alkaline metal sulfide formed is hydrolyzed with the side product, water. Therefore, for preventing the hydrolysis, a high-purity alkaline metal sulfide must be formed first. To effectively prevent the hydrolysis, the reaction system is dehydrated while being bubbled with hydrogen sulfide gas introduced thereinto. The hydrogen sulfide gas bubbling shall follow the step of forming the alkaline metal hydrosulfide and shall be continued until the system comes to contain substantially no water remaining therein. More concretely, the condition where "the system contains substantially no water remaining therein" is meant to indicate that the water concentration in the reaction liquid is at most 1% by weight, more preferably at most 0.5% by weight. In that controlled condition, a high-purity alkaline metal sulfide is formed first. The alkaline metal hydrosulfide formation and the water removal may be effected in one step or in different steps. The bubbling hydrogen sulfide pressure may be normal pressure or increased pressure; and the flow rate of the bubbling gas is not specifically defined. The bubbling time shall be not shorter than the time to be obtained by dividing the necessary amount of hydrogen sulfide (this is calculated from the ratio of the reactants, that is, the hydrogen sulfide-to-alkaline metal hydroxide ratio noted above) by the flow rate of the bubbling hydrogen sulfide gas. Namely, in the invention, an excess amount of hydrogen sulfide must be bubbled into the reaction system, relative to the amount of the other reactant, alkaline metal hydroxide, and, in addition, the bubbling must be continued before the system comes to contain substantially no water remaining therein. The gas bubbling method is not specifically defined, for which, however, preferred is a reactor unit having a stirrer for stirring the alkaline metal hydroxide and equipped with a condenser at its top.

After the system has come to contain substantially no water remaining therein, a predetermined amount of water is added to the system. All or a part of water added is consumed for hydrolysis of the alkaline metal sulfide and the alkaline metal hydrosulfide to give an alkaline metal hydroxide. The alkaline metal hydroxide thus formed in this stage is to control the alkaline metal-to-sulfur ratio in the final product, alkaline metal sulfide to a desired one. Therefore, the amount of the alkaline metal hydroxide to be formed through hydrolysis in this stage shall be monitored by sampling the reaction mixture and measuring the water content remaining in the mixture. In general, the degree of hydrolysis to give the alkaline metal hydroxide in this stage could be estimated from the reaction time. During the stage of hydrolysis, water is prevented from flowing outside the system, while hydrogen sulfide formed as the side product is discharged outside the system.

To further promote the conversion of the alkaline metal hydrosulfide still remaining in the system into the alkaline metal sulfide, the system is heated or is bubbled with an inert gas introduced thereinto under heat for dehydrosulfurization. The degree of the last dehydrosulfurization is controlled so as to make the alkaline metal-to-sulfur molar ratio in the final product, alkaline metal sulfide, fall within the range between 1 and 2. The bubbling inert gas for use in the invention is not specifically defined, but, in general, preferred is nitrogen gas. The bubbling inert gas pressure is not also specifically defined, and may be normal pressure or increased pressure. The bubbling gas flow rate is not also specifically defined. The bubbling time and also the heating time may be controlled by measuring the concentration of the non-reacted alkaline metal hydrosulfide remaining in the reaction liquid, but, in general, it could be estimated from the reaction time. After the reaction, recovered is the final product, alkaline metal sulfide solution in which the ratio by mol of the alkaline metal to sulfur is controlled to a desired one. This may be used as the sulfur carrier for polymerization to give polyarylene sulfides.

Second Embodiment

The second embodiment of the invention for producing the alkaline metal sulfide solution differs from the first embodiment thereof in that, in the first embodiment, a predetermined amount of water is added to the reaction system for hydrolysis after the system has come to contain substantially no water remaining therein, while in the second embodiment, the system is hydrolyzed with water remaining therein after the water content in the system has reached a predetermined amount.

Precisely, the first embodiment is the same as the second embodiment in point of controlling the alkaline metal-to-sulfur molar ratio in the final product, alkaline metal sulfide solution though hydrolysis with a controlled amount of water, but differs from it in that, in the first embodiment, an alkaline metal sulfide having a reduced impurity content is formed first, and then this is hydrolyzed, while in the second embodiment, the system is hydrolyzed in the course of its dehydration.

For controlling the amount of the alkaline metal hydroxide to be formed through hydrolysis, the amount of water needed is at least equivalent by mol to the amount of the alkaline metal hydroxide enough to ensure the intended alkaline metal-to-sulfur molar ratio in the product. Accordingly, the predetermined amount of water to remain in the reaction system for hydrolysis shall be at least the necessary amount of water for ensuring the intended alkaline metal-to-sulfur molar ratio in the product. However, if too much water over the necessary amount is added to the system, it is unfavorable as it has some negative influences on polymerization to form polyarylene sulfides, etc. The degree of hydrolysis of the reaction system is monitored by sampling the reaction mixture and measuring the amount of water remaining in the sampled mixture, but, in general, it may be estimated from the reaction system.

Bubbling the reaction system with hydrogen sulfide gas will interfere with the hydrolysis of the system. Therefore, after the water content remaining in the system has reached a predetermined amount in this stage for hydrolysis, the hydrogen sulfide gas bubbling is stopped. During hydrolysis, water is prevented from flowing outside the system, and the side product, hydrogen sulfide is discharged outside the system.

In the second embodiment, the degree of hydrolysis is controlled in the manner noted above, whereby the alkaline metal-to-sulfur molar ratio in the final product, alkaline metal sulfide solution is controlled to be at least 2.0. On the other hand, for controlling the alkaline metal-to-sulfur molar ratio in the final product, alkaline metal sulfide solution, to fall between 1.0 and 2.0 in the second embodiment, the same as in the first embodiment shall apply to the second embodiment.

Third Embodiment

The third embodiment of the invention for producing the alkaline metal sulfide solution is to follow the first and second embodiments, in which, however, a compound capable of being azeotropic with water is added to the starting reaction system to give the intended alkaline metal sulfide solution.

The compound capable of being azeotropic with water for use in the invention is preferably one having a boiling point of not higher than 200° C., including, for example, aromatic hydrocarbons such as benzene, toluene, ethylbenzene, etc.; aliphatic hydrocarbons such as pentane, hexane, cyclohexane, etc.; halogenohydrocarbons such as chlorobenzene, p-dichlorobenzene, etc. Of those, especially preferred are toluene and p-dichlorobenzene.

Adding such a compound capable of being azeotropic with water to the reaction system in the invention enables the reaction at lower temperatures, therefore evading the negative influences of the thermally-unstable, aprotic organic solvent on the reaction. The azeotropic compound used in the third embodiment can be removed from the system along with water, and the same as in the first and second embodiments shall directly apply to the third embodiment. Accordingly, in the third embodiment, the reaction liquid is bubbled with hydrogen sulfide introduced thereinto under heat for dehydration and dehydrosulfurization; and, after the system has come to contain substantially no water remaining therein, or after the water content remaining in the system has reached a predetermined amount, the hydrogen sulfide bubbling is stopped and the system is further heated or is bubbled with an inert gas introduced thereinto for dehydrosulfurization, while water is prevented from flowing outside the system, thereby giving the final product, anhydrous alkaline metal sulfide.

The amount of the azeotropic compound to be used shall be generally the necessary amount thereof for forming an azeotrope with water originally existing in the starting system and also with water produced as the side product through the reaction, and it varies depending on the type of the azeotropic compound. For example, for toluene, its amount to be used may be at least one mol relative to one mol of water.

Fourth Embodiment

The fourth embodiment of the invention for producing the alkaline metal sulfide solution is a continuous process for the first and second embodiments and also for the third embodiment where a compound capable of azeotropic with water is added to the starting reaction system. As compared with the batch process of others, the continuous process of the fourth embodiment is advantageous in that the bubbling hydrogen sulfide and the azeotropic compound can be recycled and, in addition, the starting liquid can be continuously put into the hot reaction system having been already heated. Therefore, in the continuous process, the time for system dehydration under heat can be shortened, and the time for which the reaction system is kept in contact with water that may cause undesired hydrolysis can also be shortened. What is more, where the series of reaction is effected in two separate but combined units, a reactor and a hold tank, in such a manner that the hydrolysis is controlled in the hold tank, its continuous operation is effected more smoothly to ensure increased productivity.

(1) Method of the Invention for Continuous Production of Alkaline Metal Sulfide Solution—Mode 1

The process flow chart of one mode of the method of the invention for continuously producing the alkaline metal sulfide solution is shown in FIG. 2, which is referred to in the following description.

1) A solution of an alkaline metal hydroxide and optionally a compound capable of being azeotropic with water in an aprotic organic solvent is continuously fed into a reactor unit having a stirrer therein and equipped with a distillation tower or column, with the liquid level in the reactor being kept constant.

In this step, the starting reaction liquid is continuously fed into the reactor. In the reactor, the liquid is stirred to such a degree that the alkaline metal hydroxide therein does not deposit.

2) The solution in the reactor is bubbled with hydrogen sulfide gas introduced thereinto under heat for dehydration and dehydrosulfurization, while the pressure in the reactor is controlled to fall between 2 mmHg abs. and 2.0 kg/cm$^2$G, and the temperature therein to fall between 50 and 250° C.

In this step, the hydrogen sulfide gas is introduced into the reactor through its bottom, whereby the liquid in the reactor is entirely bubbled and heated.

3) (i) The side product, water and hydrogen sulfide are expelled from the system through distillation, (ii) optionally, at least a part of the expelled hydrogen sulfide is recycled for bubbling the system, and (iii) the azeotropic compound having been condensed and separated from water in the receiver at the top of the distillation tower or column is recirculated back into the reactor unit optionally along with a part of a fresh azeotropic compound.

In this step, the side product, water, hydrogen sulfide, and also the azeotropic compound, if used, are evaporated away through the top of the distillation tower or column. Of these, the hydrogen sulfide gas is recovered in a condenser, and recycled for bubbling the system, while, the others, the condensed water and azeotropic compound are separated in a separator. Only the thus-separated azeotropic compound is recirculated into the system, and water is discharged outside the system.

4) After the system has come to contain substantially no water remaining therein, the hydrogen sulfide gas introduction is stopped, then the reaction liquid is transferred from the reactor to a hold tank, a predetermined amount of water is added thereto, expelling water from the system is stopped, and subsequently the system is heated or bubbled with an inert gas introduced thereinto under heat for dehydrosulfurization. In the final product, alkaline metal sulfide solution thus produced, the alkaline metal-to-sulfur molar ratio is controlled to a desired one.

In this step, the presence or substantial absence of water remaining in the liquid system can be confirmed by measuring the water content of the system. Concretely, in this step, the amount of water in the system having been heated and bubbled with hydrogen sulfide gas is controlled until the amount of water evaporated away along with the azeotropic compound could be balanced with the amount of water originally existing in the starting reaction liquid put into the reactor. In the present continuous process, the reactor unit is driven under the balanced condition so as to be let in the condition in which the system contains substantially no water remaining therein. After this, the hydrogen sulfide gas bubbling is stopped, and the liquid in the reactor is transferred into a hold tank as in FIG. 2. Next, a predetermined amount of water is added to the liquid, which is then heated or bubbled with an inert gas introduced thereinto for hydrolysis, while water is prevented from flowing outside the system. The side product, hydrogen sulfide formed in this stage is discharged outside the system.

After a predetermined period of time, the reaction mixture is sampled, and checked for the degree of hydrolysis. In case where the amount of the alkaline metal hydrosulfide remaining therein is large, the mixture is further heated or bubbled with an inert gas.

After having been confirmed to have a predetermined, controlled alkaline metal-to-sulfur molar ratio, the product, alkaline metal sulfide-containing solution is taken out of the hold tank. In general, this is directly used in polymerization to give polyarylene sulfides.

(2) Method of the Invention for Continuous Production of Alkaline Metal Sulfide Solution—Mode 2:

The continuous production mode 1 noted above is a combination of the first embodiment and the third embodiment of the invention. Another mode of continuous production of the alkaline metal sulfide solution of the invention is described herein. This is a combination of the second embodiment and the third embodiment of the invention, and is referred to as continuous production mode 2.

The two continuous production modes 1 and 2 differ from each other in that, in the continuous production mode 1, a predetermined amount of water is added for hydrolysis after the system has come to contain substantially no water remaining therein, while in the continuous production mode 2, the system is hydrolyzed after the water content remaining therein has reached a predetermined amount.

Concretely, in the continuous production mode 1, after the system has come to contain substantially no water remaining therein, the hydrogen sulfide gas introduction is stopped, then the reaction liquid is transferred from the reactor to a hold tank, a predetermined amount of water is added thereto, expelling water from the system is stopped, and subsequently the system is heated or bubbled with an inert gas introduced thereinto under heat for dehydrosulfurization, as in the step 4) mentioned above; while in the continuous production mode 2, the step 4) in the mode 1 is replaced by the following:

4) After the water content remaining in the system has reached a predetermined amount, the hydrogen sulfide gas introduction is stopped, then the liquid is transferred from the reactor to a hold tank, expelling water from the system is stopped, and subsequently the system is heated or bubbled with an inert gas introduced thereinto under heat for dehydrosulfurization.

In this section, described is the step 4) for the mode 2, which comprises, "after the water content remaining in the system has reached a predetermined amount, stopping the hydrogen sulfide gas introduction, then transferring the liquid from the reactor to a hold tank, stopping expelling water from the system, and subsequently heating the system or bubbling the system with an inert gas being introduced thereinto under heat for dehydrosulfurization".

For controlling the water content that remains in the system to a predetermined level in this step, the amount of water in the system having been heated and bubbled with hydrogen sulfide gas is so controlled that the difference between the amount of water to be evaporated away along with the azeotropic compound and the amount of water originally existing in the starting reaction liquid put into the reactor could be the predetermined amount of water that shall remain in the reaction system, as has been described hereinabove. In the present continuous mode 2, the reactor unit is generally driven under the controlled condition.

After this, the liquid in the reactor, of which the remaining water content is so controlled as above, is then transferred into a hold tank, and hydrolyzed, and thereafter the amount of the alkaline metal hydrosulfide remaining in the reaction system (this is to finally control the alkaline metal-to-sulfur molar ratio in the product, alkaline metal sulfide solution), like in the continuous production mode 1. Accordingly, also in the continuous production mode 2, the alkaline metal sulfide solution produced could have a controlled, predetermined alkaline metal-to-sulfur molar ratio.

EXAMPLES

The invention is described in more detail with reference to the following Examples. Examples 1 and 2, Comparative Examples 1 to 3 and Reference Example 1 are for the method of producing a high-purity anhydrous alkaline metal sulfide; while Examples 3 and 4, Comparative Example 4 and Reference Example 2 are for the method of producing an alkaline metal sulfide solution.

Example 1

28.8 g (1.2 mols) of lithiumhydroxide anhydride and 337.5 g (3.4 mols) of N-methyl-2-pyrrolidone (NMP) were put into a flask equipped with a stirrer and a condenser. With stirring at 350 rpm, this was bubbled with hydrogen sulfide gas introduced into the liquid phase at room temperature. The liquid temperature increased up to about 90° C. owing to the reaction heat. Then, the liquid was further heated up to 100° C., and was still bubbled with hydrogen sulfide gas for about 1 hour. No solid was seen in the reaction liquid. A part of the reaction liquid was sampled, and subjected to potentiometric titration for fractional quantification of lithium hydroxide, lithium hydrosulfide and lithium sulfide therein. In this, neither lithium hydroxide nor lithium sulfide was detected, and a high concentration of lithium hydrosulfide was found formed in the sample. The water content of the sample was 5.3% by weight.

Next, the reaction liquid was further heated, while being still bubbled with hydrogen sulfide gas introduced thereinto (100 cc/min). At the temperature (170° C.) at which water began to reflux in the liquid, 100 cc of toluene serving as an azeotropic agent was gradually added to the liquid via a dropping funnel. While the distillate was discharged outside the system, the liquid was dehydrated. When the liquid temperature reached 180° C., the amount of water remaining in the liquid was measured. The water content thus measured was 0.5% by weight. In this stage, the hydrogen sulfide gas introduction was stopped, and the liquid was bubbled with nitrogen gas for dehydrosulfurization. After having been thus bubbled with nitrogen gas for 2 hours, the slurry was sampled, and its Li/S ratio (195° C.) was 1.95. The product contained lithium sulfide and a trace of non-reacted lithium hydrosulfide, but not lithium hydroxide.

Comparative Example 1

In the process of Example 1, the reaction liquid having been bubbled with hydrogen sulfide gas for one hour was analyzed. Next, this was heated, while being bubbled with nitrogen gas introduced thereinto at a flow rate of 100 cc/min, but not with hydrogen sulfide gas. After the liquid temperature reached 170° C., water and NMP began to evaporate away through the top of the distillation column via the condenser. In a while from the start of the water and NMP evaporation, white particles began to disperse in the reaction liquid. The distillate was taken out of the system, and the reaction was continued for 1.5 hours. After the reaction, the liquid temperature was 200° C. The product was in the form of slurry containing lithium sulfide and a trace of lithium hydroxide. The powder from it had an Li/S ratio of 2.54, and had a water content of 0.1% by weight.

Comparative Example 2

Lithium hydrosulfide was formed in the same manner as in Example 1. In this stage, bubbling the reaction liquid with hydrogen sulfide was stopped. Without removing water from it, the distillate liquid was entirely recirculated back into the flask, and hydrogen sulfide gas was discharged outside the flask. The reaction liquid was heated, without being bubbled with nitrogen gas. When its temperature reached 170° C., the liquid was kept as it was for 1.5 hours. With further reaction, the liquid temperature reached 200° C. The product thus produced was almost entirely lithium hydroxide. The powder from it had an Li/S ratio of 7.16, and had a water content of 1.0% by weight.

Reference Example 1

11.6 g (0.25 mols) of a chemical reagent, anhydrous lithium sulfide, and 350.0 g (3.5 mols) of NMP were put into a flask equipped with a stirrer and a condenser, and bubbled with hydrogen sulfide gas introduced thereinto, while being stirred at 350 rpm at room temperature. Thus was formed anhydrous lithium hydrosulfide. Owing to its reaction heat, the reaction liquid reached 65° C., and then this was further heated up to 100° C. No solid remained in the reaction liquid, and the product formed was 100% lithium hydrosulfide. The liquid was heated up to the boiling point (204° C.) of NMP, and the distillate from it was entirely recirculated back into the flask. While hydrogen sulfide gas was discharged outside the system, the liquid was kept as it was for 2 hours. During the step, a solid formed in the reaction liquid, which had an Li/S ratio of 1.92. Though containing a trace of non-reacted lithium hydrosulfide, the powdery product was lithium sulfide.

Example 2

28.8 g (1.2 mols) of lithium hydroxide anhydride, 337.5 g (3.4 mols) of NMP, and 100 cc of toluene serving as an azeotropic agent were put into a flask equipped with a stirrer and a decanter, and heated, while being bubbled with hydrogen sulfide gas introduced into the liquid phase at a flow rate of 200 cc/min. While being thus heated and bubbled, this was stirred at 350 rpm. At 120° C., water and toluene began to evaporate away. Toluene was separated in the decanter and continuously recirculated back into the system, while water was discharged outside. In a while from the start of the water and toluene evaporation, particles began to disperse in the system. The concentration of toluene remaining in the liquid phase was kept constant (10% by weight), and the liquid temperature was controlled at 130° C. When the liquid in the decanter came to no more separate into two phases, its water content was measured, and was 0.5% by weight. In this stage, the bubbling gas was changed from hydrogen sulfide to nitrogen. While the liquid was bubbled with nitrogen gas, toluene evaporated away. After the liquid temperature reached the boiling point of NMP, 204° C., the reaction was terminated. After having been thus reacted, the reaction liquid contained fine particles of anhydrous lithium sulfide dispersed in NMP. The product had an Li/S ratio of 2.01.

Comparative Example 3

In the process of Example 2, when the liquid temperature reached 120° C. and water and toluene began to evaporate, the liquid was bubbled with nitrogen gas (200 cc/min) for dehydration, but not with hydrogen sulfide gas. Except this, the others were the same as in Example 2. The product thus obtained herein contained a large amount of lithium hydroxide, and its Li/S ratio was 3.79.

Example 3

320.95 g (3.2 mols) of N-methyl-2-pyrrolidone (NMP) and 28.46 g (1.2 mols) of lithium hydroxide anhydride were put into a 500 ml separable glass flask equipped with a stirrer and a condenser. With stirring at 150 rpm, this was bubbled with hydrogen sulfide gas introduced into the liquid phase at 100° C. and at a flow rate of 1500 ml/min. After 60 minutes, the solid completely disappeared in the liquid. In this stage, the liquid was heated while being still bubbled with nitrogen sulfide, of which, however, the flow rate was lowered to 100 ml/min. At 170° C., water began to reflux, and 100 ml of toluene was gradually added to the liquid via a dropping funnel. In that condition, the liquid was dehydrated at 180° C. After having been thus dehydrated, the liquid was heated up to 190° C., and was bubbled with nitrogen gas but not with hydrogen sulfide gas. Just before the bubbling gas was changed to nitrogen, the liquid in the flask had an Li/S ratio of 1.91 and contained some non-reacted lithium hydrosulfide, and its water content was 1.5% by weight. This was further bubbled with nitrogen gas at a flow rate of 90 ml/min, while the refluxed liquid was all recirculated back into the flask. After having been thus processed for 160 minutes in that condition, the final product was found to have an Li/S ratio of 2.52, but its water content was below the detectable limit. Analyzed through potentiometric titration, the product was found to contain lithium hydroxide.

From the data of the water content of the intermediate liquid processed in the flask and on the presumption that all water having existed in the liquid was entirely consumed for hydrolysis of lithium sulfide and lithium hydrosulfide formed in the liquid, it is calculated that the final product shall have an Li/S ratio of 2.58. The measured value of the Li/S ratio in the final product, 2.52 as above is nearly comparable to the calculated value thereof, 2.58, and this supports that, in the process tested herein, the Li/S ratio in the final product produced could be well controlled to any desired one.

Example 4

A lithium hydrosulfide solution was prepared in the same manner as in Example 3, and this was then completely dehydrated for 2 hours at 180° C. to such a degree that its water content was below the detectable limit. After having been thus completely dehydrated, the solution had an Li/S ratio of 2.0. To this was added 0.1 mols, relative to one mol of Li, of water, and the resulting liquid was heated. At 202° C., this began to reflux, and the refluxed liquid was entirely recirculated back into the flask. In that condition, the system was kept as it was for 3 hours, and its temperature reached 204° C. After cooled, the liquid phase was sampled and analyzed through potentiometric titration. As a result, the final product was found to have an Li/S ratio of 2.12 but its water content was below the detectable limit.

From the predetermined amount of water added to the intermediate liquid processed in the flask and on the presumption that all water having existed in the liquid was entirely consumed for hydrolysis of lithium sulfide and lithium hydrosulfide formed in the liquid, it is calculated that the final product shall have an Li/S ratio of 2.22. The measured value of the Li/S ratio in the final product, 2.12 as above is nearly comparable to the calculated value thereof, 2.22, and this supports that, in the process tested herein, the Li/S ratio in the final product produced could be well controlled to any desired one.

Comparative Example 4

A lithium hydrosulfide solution was prepared in the same manner as in Example 3, and this was heated while being bubbled with hydrogen sulfide introduced into the liquid phase at a flow rate of 100 ml/min. At 160° C., water began to evaporate. After this was further heated up to 180° C., 100 ml of toluene was gradually added thereto via a dropping funnel, and this was dehydrated. After having been thus dehydrated, this was still further heated up to 195° C., and was bubbled with nitrogen gas, but not with hydrogen sulfide gas, for dehydrosulfurization. Having been thus bubbled with nitrogen gas for 80 minutes, the product was found to have an Li/S ratio of 1.92 and its water content was below the detectable limit. This was further bubbled with nitrogen under heat for 60 and 1300 minutes while the refluxed liquid was all recirculated back into the flask, but its Li/S ratio was 1.95 and 1.97, respectively. In this process, there is found no significant difference between the Li/S ratio in the intermediate product, 1.92 as above, and that in the final product, 1.95 or 1.97.

Reference Example 2

342.27 g (3.5 mols) of N-methyl-2-pyrrolidone (NMP), 11.75 g (0.26 mols) of lithium sulfide anhydride, and 4.5 g (0.25 mols) of deionized water were put into a 500 ml separable glass flask equipped with a stirrer and a condenser, and heated, while being stirred at 350 rpm. At 196° C., this began to reflux, and the refluxed liquid was entirely recirculated back into the flask. In this stage, the liquid in the flask had an Li/S ratio of 2.33, and had awater content of 0.7% by weight. Then, the system was kept entirely refluxed for a while, and its temperature reached 201° C. while water therein was consumed for hydrolysis. 90 minutes after the system was thus kept entirely refluxed under heat in that condition, the liquid in the flask had an Li/S ratio of 3.2 and its water content was below the detectable limit. After that, the composition of the liquid did not change.

From the predetermined amount of water added to the system and on the presumption that all water having existed in the system was entirely consumed for hydrolysis of lithium sulfide, it is calculated that the final product shall have an Li/S ratio of 3.42. The measured value of the Li/S ratio in the product, 3.2 as above is nearly comparable to the calculated value thereof, 3.42, and this supports that, in the process tested herein, the Li/S ratio in the product produced could be well controlled to any desired one.

According to the method of the invention described in detail hereinabove with reference to its embodiments, obtained is an anhydrous alkaline metal sulfide of high purity. As opposed to this, however, if the reaction system is not sufficiently dehydrated while being bubbled with nitrogen sulfide introduc ed thereinto, for example, as in Comparative Examples 1 to 2, the final product produced will inevitably contain lithium hydroxide. In the method of the invention, even if the time for nitrogen gas bubbling in the final step of dehydrosulfurization is only about 2 hours or so, the amount of the non-reacted lithium hydrosulfide that may remain in the final product could be reduced. Also in the continuous production method of the invention, for example, as in Example 2, an anhydrous alkaline metal sulfide of high purity can be obtained in an efficient manner.

According to the method of the invention for producing an alkaline metal sulfide solution, the degree of hydrolysis of the intermediate can be well controlled in any desired manner, by suitably controlling the amount of water to be formed during the method and controlling the reaction time. Therefore, the alkaline metal-to-sulfur ratio in the alkaline metal sulfide solution produced in the method can be well controlled to any desired one.

What is claimed is:

1. A method for producing an anhydrous alkali metal sulfide, which comprises:
    a) bubbling a solution of an alkali metal hydroxide in an aprotic organic solvent, with hydrogen sulfide gas under heat, thereby forming a product comprising alkali metal hydrosulfide; and then
    b) terminating the hydrogen sulfide introduction after the system has come to contain substantially no water remaining therein, and heating the system, thereby effecting dehydrosulfurization to form said alkali metal sulfide.

2. The method of claim 1, wherein the solution of the alkali metal hydroxide in an aprotic organic solvent contains a compound capable of forming an azeotrope with water.

3. The method of claim 2, wherein said compound capable of forming an azeotrope with water comprises aromatic hydrocarbons, aliphatic hydrocarbons or halogenohydrocarbons.

4. The method of claim 3, wherein said compound capable of forming an azeotrope with water comprises toluene or p-dichlorobenzene.

5. The method of claim 1, wherein said hydrogen sulfide gas is bubbled into said solution at a pressure of from between 2 mmHg abs. and 2.0 kg/cm$^2$ abs.

6. The method of claim 5, wherein said pressure is between 400 mgHg abs. and 1.5 kg/cm$^2$ abs.

7. The method of claim 1, wherein said hydrogen sulfide gas is bubbled into said solution at a reaction temperature of between 50 and 250° C.

8. The method of claim 7, wherein said reaction temperature is between 100 and 200° C.

9. The method of claim 1, wherein said alkali metal hydroxide is selected from the group consisting of lithium hydroxide, sodium hydroxide and potassium hydroxide.

10. The method of claim 9, wherein said alkali metal hydroxide is anhydrous.

11. The method of claim 1, wherein said aprotic polar solvent comprises N-alkylcaprolactam, or N-alkylpyrrolidones or a mixture thereof.

12. The method of claim 11, wherein said aprotic polar solvent is N-methy-2-pyrrolidone.

13. The method of claim 1, wherein said hydrogen sulfide gas and said alkali metal hydroxide are used in a ratio of hydrogen sulfide to alkali metal hydroxide of between 0.80 and 6.00.

14. The method of claim 1, wherein said hydrogen sulfide introduction is terminated in step b), when a water concentration in said solution is at most 5% by weight.

15. The method of claim 14, wherein said hydrogen sulfide introduction is terminated in step b), when said water concentration in said solution is at most 0.5% by weight.

16. The method of claim 1, which further comprises, after step a) and before step b), determining an amount of water to remain in said solution for said dehydrosulfurization, thereby adjusting a ratio of alkali metal/sulfur in the product anhydrous alkali metal sulfide.

17. The method of claim 1, wherein said product anhydrous alkali metal sulfide has an alkali metal/sulfur ratio of:
    $1.90 \leq$ alkali metal/sulfur (by mol)$\leq 2.10$.

18. The method for producing the alkali metal sulfide of claim 1, wherein the solution of the alkali metal hydroxide in an aprotic organic solvent contains a compound capable of forming an azeotrope with water.

19. A method for producing an anhydrous alkali metal sulfide, which comprises:
    a) bubbling a solution of an alkali metal hydroxide in an aprotic organic solvent, with hydrogen sulfide gas under heat, thereby forming a product comprising alkali metal hydrosulfide; and, after the system has come to contain substantially no water remaining therein;
    b) terminating the introduction of hydrogen sulfide gas, and bubbling an inert gas into the solution, thereby effecting dehydrosulfurization to form said alkali metal hydrosulfide.

20. The method of claim 19, wherein said inert gas is nitrogen.

21. A method for continuously producing an anhydrous alkali metal sulfide, which comprises:
    (1) continuously feeding a solution of an alkali metal hydroxide in an aprotic organic solvent into a reactor having a stirrer therein and being equipped with a distillation tower or column, with the solution level in the reactor being kept constant;
    (2) bubbling the solution in the reactor with hydrogen sulfide gas under heat, thereby forming a product comprising alkali metal hydrosulfide, while the pressure in the reactor is maintained between 2 mmHg abs. and 2.0 kg/cm²/abs., and the temperature therein maintained between 50 and 250° C.;

(3) (i) expelling a side product comprising, water and hydrogen sulfide from the system by distillation, and (ii) optionally recycling at least a part of the expelled hydrogen sulfide for bubbling into the system; and (4) after the system has come to contain substantially no water remaining therein, transferring the solution of step(2) comprising said alkali metal hydrosulfide in the aprotic organic solvent into a degassing tank, followed by heating it or further bubbling it with an inert gas thereby effecting dehydrosulfurization to form said alkali metal sulfide.

22. The method of claim 21, wherein said inert gas is nitrogen.

23. A method for continuously producing an anhydrous alkali metal sulfide, which comprises:

(1) continuously feeding a solution of an alkali metal hydroxide and a compound capable of forming an azeotrope with water in an aprotic organic solvent into a reactor having a stirrer therein and being equipped with a distillation tower or column, with the solution level in the reactor being maintained as constant;

(2) bubbling the solution in the reactor with hydrogen sulfide gas under heat, thereby forming a product comprising alkali metal hydrosulfide, while the pressure in the reactor is maintained between 2 mmnHg abs. and 2.0 kg/cm²abs., and the temperature therein maintained between 50 and 250° C.;

(3) (i) separating a side product comprising, water, hydrogen sulfide, and the azeotropic compound through distillation, and expelling the side product comprising water and hydrogen sulfide from the system;
  (ii) optionally recycling at least a part of the expelled hydrogen sulfide for bubbling into the system; and
  (iii) recirculating the azeotropic compound having been condensed and separated from water in a receiver at the top of the distillation tower or column, back into the reactor optionally along with a part of a fresh azeotropic compound; and (4) after the system has come to contain substantially no water remaining therein, transferring the solution of step (2) comprising the alkali metal hydrosulfide in the aprotic organic solvent into a degassing tank, followed by heating it or further bubbling it with an inert gas being introduced thereinto, thereby effecting dehydrosulfurization to form said alkali metal sulfide.

24. The method of claim 23, wherein said inert gas is nitrogen.

25. A method for producing an alkali metal sulfide solution with an alkali metal-to-sulfur molar ratio therein being controlled, which comprises:

a) bubbling a solution of an alkali metal hydroxide in an aprotic organic solvent, with hydrogen sulfide gas being introduced thereinto under heat, thereby forming a product comprising alkali metal hydrosulfide, then stopping the hydrogen sulfide gas introduction after the system has come to contain substantially no water remaining therein;

b) adding an amount of water to the solution; and c) heating the system thereby effecting dehydrosulfurization and preventing water from flowing out of the system, to form said alkali metal sulfide solution; said amount of water added to said solution effecting control of said alkali metal-to-metal sulfur molar ratio.

26. A method for producing an alkali metal sulfide solution with the alkali metal-to-sulfur molar ratio therein being controlled, which comprises:

a) bubbling a solution of an alkali metal hydroxide in an aprotic organic solvent, with hydrogen sulfide gas being introduced thereinto under heat, thereby forming a product comprising alkali metal hydrosulfide, then adding a predetermined amount of water to the solution after the solution has come to contain substantially no water remaining therein;

b) heating the solution and preventing water from flowing out of the system; and c) bubbling the solution with an inert gas thereinto, thereby effecting dehydrosulfurization to form said alkali metal sulfide solution.

27. The method of claim 26, wherein said inert gas is nitrogen.

28. A method for producing an alkali metal sulfide solution with the alkali metal-to-sulfur molar ratio therein being controlled, which comprises:

a) bubbling a solution of an alkali metal hydroxide in an aprotic organic solvent, with hydrogen sulfide gas under heat, thereby forming a product comprising alkali metal hydrosulfide, then stopping the hydrogen sulfide gas introduction after the water content remaining in the solution has reached a predetermined amount; and b) heating the solution thereby effecting dehydrosulfurization and preventing water from flowing out of the system, to form said alkali metal sulfide solution.

29. A method for producing an alkali metal sulfide solution with the alkali metal-to-sulfur molar ratio therein being controlled, which comprises:

a) bubbling a solution of an alkali metal hydroxide in an aprotic organic solvent, with hydrogen sulfide gas under heat, thereby forming a product comprising alkali metal hydrosulfide, and, after the water content remaining in the system has reached a predetermined amount;

b) heating the system with preventing water and flowing out of the system, and bubbling it with an inert gas thereinto, thereby effecting dehydrosulfurization to form said alkali metal sulfide solution.

30. The method of claim 29, wherein the solution of an alkali metal hydroxide solution in an aprotic organic solvent contains a compound capable of forming an azeotrope with water.

31. A method for continuously producing an alkali metal sulfide solution with the alkali metal-to-sulfur molar ratio therein being controlled, which comprises:

(1) continuously feeding a solution of an alkali metal hydroxide and optionally a compound capable of forming an azeotrope with water in an aprotic organic solvent into a reactor having a stirrer therein and being equipped with a distillation tower or column, with the solution level in the reactor being maintained as constant;

(2) bubbling the solution in the reactor with hydrogen sulfide gas under heat, thereby forming a product comprising alkali metal hydrosulfide, while the pressure in the reactor is maintained between 2 mmHg abs. and 2.0 kg/cm² abs., and the temperature therein maintained between 50 and 250° C.;

(3) (i) expelling a side product comprising, water and hydrogen sulfide from the solution by distillation, (ii) optionally recycling at least a part of the expelled hydrogen sulfide for bubbling the system; and (iii) recirculating the compound capable of forming the azeotrope with water having been condensed and separated from water in the receiver at the top of the distillation tower or column, back into the reactor optionally along with a part of a fresh azeotropic compound; and (4) after the system has come to contain substantially no water remaining therein, stopping the introduction of hydrogen sulfide gas, then transferring the solution from the reactor to a holding tank, adding thereto a predetermined amount of water, terminating expulsion of water from the system, and subsequently heating the solution or bubbling the solution with an inert gas under heat thereby effecting dehydrosulfurization to form said alkali metal sulfide solution.

32. A method for continuously producing an alkali metal sulfide solution with the alkali metal-to-sulfur molar ratio therein being controlled, which comprises:

(1) continuously feeding a solution of an alkali metal hydroxide and optionally a compound capable of forming an azeotrope with water in an aprotic organic solvent into a reactor having a stirrer therein and being equipped with a distillation tower or column, with the solution level in the reactor being kept constant;

(2) bubbling the solution in the reactor with hydrogen sulfide gas under heat, thereby forming a product comprising alkali metal hydrosulfide, while the pressure in the reactor is maintained between 2 mmHg abs. and 2.0 kg/cm$^2$ abs., and the temperature therein maintained between 50 and 250° C.;

(3) (i) expelling a side product comprising, water and hydrogen sulfide from the system through distillation, (ii) optionally recycling at least a part of the expelled hydrogen sulfide for bubbling the system; and (iii) recirculating the compound capable of forming the azeotrope with water having been condensed and separated from water in a receiver at the top of the distillation tower or column, back into the reactor unit optionally along with a part of a compound forming the azeotrope with water; and (4) after the water content remaining in the system has reached a predetermined amount, stopping the hydrogen sulfide gas introduction, then transferring the liquid from the reactor to a hold tank, stopping the expulsion of water from the system, and subsequently heating the system or bubbling the system with an inert gas under heat thereby effecting dehydrosulfurization to form said alkali metal sulfide solution.

* * * * *